United States Patent [19]

Wristers, deceased et al.

[11] 4,272,405

[45] * Jun. 9, 1981

[54] ZIEGLER TRANSITION METAL HALIDE CATALYSTS AND METHOD THEREFOR

[75] Inventors: Harry J. Wristers, deceased, late of Baytown, Tex.; by Joy K. Wristers, sole beneficiary, Baytown, Tex.

[73] Assignee: Exxon Research & Engineering Co., Florham Park, N.J.

[*] Notice: The portion of the term of this patent subsequent to Nov. 9, 1993, has been disclaimed.

[21] Appl. No.: 69,652

[22] Filed: Aug. 27, 1979

Related U.S. Application Data

[63] Continuation-in-part of Ser. No. 736,049, Oct. 27, 1976, abandoned, which is a continuation-in-part of Ser. No. 523,354, Nov. 13, 1974, Pat. No. 3,990,993.

[51] Int. Cl.³ .............................................. C08F 4/64
[52] U.S. Cl. .................................. 252/429 B; 526/144
[58] Field of Search ................... 252/428, 429 B, 430

[56] References Cited

U.S. PATENT DOCUMENTS

| | | | |
|---|---|---|---|
| 3,094,568 | 6/1963 | Hay et al. | 252/429 B X |
| 3,128,252 | 4/1964 | Ternquist et al. | 252/429 A |
| 3,594,330 | 7/1971 | DelBouille et al. | 252/429 A |
| 3,838,064 | 9/1974 | Vogt et al. | 252/430 X |
| 3,990,993 | 11/1976 | Wristers | 252/429 B |
| 4,098,979 | 7/1978 | Maemoto et al. | 252/429 B X |

*Primary Examiner*—Patrick Garvin
*Attorney, Agent, or Firm*—D. Roth; M. B. Kurtzman

[57] ABSTRACT

Particle size is increased and particle size range can be decreased, i.e., narrower particle size distribution can be obtained for Ziegler transition metal halide catalysts by working the catalysts with very small quantities of a fibrillatable polytetrafluoroethylene (PTFE) powder in order to trap, i.e., entangle the catalyst in a web of PTFE submicroscopic fibers.

18 Claims, No Drawings

ZIEGLER TRANSITION METAL HALIDE CATALYSTS AND METHOD THEREFOR

CROSS-REFERENCE TO RELATED APPLICATIONS

This application is a continuation-in-part of U.S. Patent Application Ser. No. 736,049, filed Oct. 27, 1976 and now abandoned, which is a continuation-in-part of Application Ser. No. 523,354, filed Nov. 13, 1974 and now U.S. Pat. No. 3,990,993.

BACKGROUND OF THE INVENTION

I. Problem to Which Invention is Directed

Polymerization catalysts, especially olefin polymerization catalysts (Ziegler transition metal halide) generally are of a wide particle size distribution which particles generally include a great many fines. It has been found that the catalyst particles provide "templates" for the formation of polymer particles; the catalyst particles themselves must be the same shape as the desired final polymer powder shape, desirably with a relatively narrow particle size distribution. Conventional high molecular weight polymer powders made with usual Ziegler catalysts generally include polymer fines. The polymer fines cause the polymer powder to be very difficult to handle. A technique that would increase the size of the catalyst particles and substantially eliminates catalyst fines would be highly desirable. In order to obtain larger powder particles, e.g., greater than about 75 microns, the catalyst particles themselves should possess a mean particle diameter of at least 10, preferably at least 20 and most preferably at least 35 microns.

II. Discussion of the Prior Art

The stereospecific polymerization of alpha-olefins such as propylene is well known in the art. Polypropylene resin has become a well established plastic in the world market. Polypropylene powder sales are also increasing rapidly and, at the present time, are increasing more rapidly than sales of polypropylene pellets. The popularity of the polypropylene powder derives, at least in part, from the rapidly expanding use of filled grades of polypropylene, particularly glass- or talc-filled grades. Additionally, energy savings accrued by the polypropylene manufacturer by eliminating the extrusion step required in pelletizing are significant.

Most customers demand that polypropylene powder provide all of the resin quality normally obtainable in pelletized products and, in addition, that the powder possess the qualities of good flowability, low fines content, and no "clods", i.e., large aggregates of particles. A reasonably high bulk density is also desirable.

The particle size distribution of Ziegler catalysts can be made narrower by controlled growth of catalyst particles. Polyolefin particle size distribution can be made narrower by agglomeration and compaction of polymer particles. Adhesive binders have been used in this latter technique; however, adhesives do not function well in Ziegler catalyst compaction since they poison the active sites of the catalyst.

No prior art is known to the inventor that embodies the concept disclosed here for eliminating Ziegler transition metal halide catalyst fines. Although a Harshaw publication entitled "Harshaw's Dustless Process" describes a similar technique of eliminating dust from inert powders, Harshaw has no contemplation for using the process to obtain catalyst particle agglomerates of increased particle size which can be employed as polymerization catalysts for the direct production of large size particle polymers.

Harshaw Chemical Company has also issued U.S. Pat. Nos. 3,838,092 and 3,838,064 which disclose and claim the generalized concept of using fibrillatable polytetrafluoroethylene as an agglomeration technique for dusting control. But, the art has no concept or contemplation of utilizing these techniques to overcome the rather special and unique problem of Ziegler transition metal halide catalyst particle as outlined in the present application.

BRIEF SUMMARY OF THE INVENTION

In its most preferred aspect, the invention involves working effective quantities of fibrillatable PTFE powder with Ziegler transition metal halide catalyst in order to increase the overall effective size of the catalyst or catalyst components which catalysts or catalyst components in accordance with this invention will provide a polymer absent fines and especially a polymer of increased particle size. Preferably the catalyst comprises a Ziegler transition metal halide, e.g., reduced $TiCl_3$, and a co-catalyst such as an aluminum alkyl (halide). Such transition metal halide catalyst components generally contain fines, e.g., 10 microns in mean particle diameter or smaller, which fines can comprise from about 0.1 to 50 wt. % of a catalyst composition. In accordance with this invention the supported catalytically active particles will have a particle size more than 10 microns and mean particle diameter consisting of a plurality of titanium halide catalytic particles in a web of submicroscopic fibers of PTFE. The catalyst can be usually employed to directly produce polymers having a particle size larger than 75 and preferably larger than 100 microns.

DETAILED DESCRIPTION OF THE INVENTION

A Ziegler transition metal halide catalyst having a narrow particle size distribution can be produced, but the final activated product, especially from a ball milling step, usually has many very tiny catalyst fines or particles, e.g., less than 1 micron up to 20 microns, usually 10 microns or less, of mean particle diameter. Such a catalyst product can be sieved to increase the mean particle diameter by separating the larger particles from the smaller, but since there is no utility for the discarded fines, this approach has not heretofore been attractive. The present invention allows for the production of large size transition metal halide catalyst by working the conventional larger and smaller particles generally obtained during the production of catalytic transition metal halides together with small quantities of PTFE to eliminate substantially all catalyst fines having a mean particle diameter of 10 microns or less. Depending on the length of time the catalyst component is worked with the PTFE the catalyst can be produced with an overall increase in particle size or with an increase of particle size and a reduction in the particle size distribution of the catalyst component.

The present invention provides a process whereby a Ziegler-type transition metal halide catalyst of larger particle size, e.g., 10 to 1,000, preferably 20 to 200 microns, most preferably 20 to 50 microns, average mean particle diameter can be produced. Furthermore as illustrated in the examples, one can, by working the PTFE and catalyst for a relatively short time period nor only increase overall particle size but also narrow particle size distribution. In its preferred embodiments, the invention is directed to increasing the overall effective size of the catalyst particles.

The present invention provides a process whereby a Ziegler-type catalyst of larger particle size, e.g., more than 10 up to 1,000, preferably 20 to 200 microns, most preferably 20 to 50 microns, average mean particle diameter can be produced from any Ziegler transition metal halide catalyst composition produced by any prior and future art technique. The particles produced by the process of the invention manifest essentially no loss in catalytic effectiveness in olefin polymerization and their use in such polymerization processes results in the production of polymer particles of increased size, i.e., about 75 microns or greater of mean size diameter.

The generalized problem of the lack of desired particle size uniformity that is obtained when one ball mills a Ziegler catalyst was described in detail in Applicants' parent application Ser. No. 736,049, now abandoned. The detailed discussion and claims were directed primarily to a situation in which the Ziegler catalyst was a cocrystallized $TiCl_3$ with aluminum chloride which had been activated by extensive ball milling. However, further experimentation has verified that Ziegler transition metal halide catalyst compositions entrapped in a web of PTFE fibers can be obtained from substantially any known Ziegler-type catalyst, respective of the process for making the catalyst.

Processes for production of Ziegler-type transition metal halide catalysts are well known and amply described in the prior art literature. Generally speaking, such commercial catalyst compositions are conventionally produced by the reduction of $TiCl_4$ and subsequent activation treatment of the resulting reduced product. The reduction of $TiCl_4$ can be accomplished with several reducing agents, such as hydrogen, titanium, magnesium or aluminum metal, aluminum alkyls, aluminum alkyl halides, etc., all of which are well known in the art.

More particularly, in known catalyst production techniques where reducing agents such as hydrogen, titanium or aluminum metals, etc., are employed, such reduction is carried out at relatively high temperatures. The reduced product is then subjected to intense working, e.g., by grinding or ball milling, to increase surface area or otherwise to convert the reduced product to a more catalytically active form. Moreover, many commercial techniques also include ball milling the reduced titanium component with aluminum trichloride to produce a $TiCl_3 \cdot \chi AlCl_3$ (where $\chi$ may range from 0 to 3, usually 0 to 1.5) active catalyst composition.

On the other hand, in procedures employing aluminum alkyl and/or aluminum alkyl halide reducing agents, the reduction step is usually carried out at relatively low temperatures. In these techniques, the resulting reduced product is usually converted to a more active form by heating without utilization of a grinding or ball milling step. Such reduced catalysts generally have the formula $TiCl_m \cdot \chi AlR_n Cl_{3-n}$, where $\chi$ ranges between 0.001 to 3.0 (preferably 0.001 to 1.5), m ranges between 2 to 3.5; and n ranges between 0 to 3.0 (preferably 0.01 to 0.3); and R is an alkyl group having 1 to 8 carbons, preferably ethyl. The specific values of $\chi$, m and n vary respectively with the specific reducing agent and process steps employed. By way of example, when diethylaluminum chloride (DEAC) is used as a reducing agent, $\chi$ will usually range from about 0.001 to about 0.50, and usually will be from 0.28 to 0.43, although theoretically $\chi$ could be 0.5. Use of ethylaluminum dichloride (EADC) results in a value of $\chi$ from 0.3 to 1.0. The catalyst having a higher $AlCl_{3-n}$ content usually will have a lower catalyst activity (expressed as grams of polymer product per gram of catalyst employed). Use of an excess of aluminum alkyl reducing agent provides a catalyst of lower $AlCl_{3-n}$ content, but the particle size is smaller.

However, any suitable reduction technique now known to the art or subsequently discovered can be used, since the reduction step per se is not at the point of novelty of the present invention.

It was also described in the parent application that normally the reduction of $TiCl_4$ results in a $TiCl_3$ mixed with (alkyl) aluminum chlorides. This is true with most reducing agents, including aluminum, magnesium and/or titanium metal halide. An exception to this general principle is when an aluminum halide dialkyl is employed wherein the alkyl groups have from 2 carbon atoms to about 5 carbon atoms the reduced products are primarily $TiCl_3$ and aluminum alkyl dichloride. Although the aluminum alkyl dichloride is capable of cocrystallization with the $TiCl_3$ and some of such cocrystallization takes place, the influence of diluents, third components and cocatalysts will often result in the removal of such aluminum alkyl dichloride, thus leaving a catalyst which is simply $TiCl_3$ alone.

For most purposes, the reduction step with aluminum triethyl, for instance, is so rapid that the resulting $TiCl_3$ is too small to be effectively utilized. If those small particles can be conveniently collected, the process of the instant invention would permit them to be entrapped in a web of PTFE fiber resulting in an overall larger catalyst mass although such particle maintains its identity within the web.

Accordingly, it is understood that the concept disclosed in this patent application will apply to formulations of Ziegler transition metal halide catalysts such as:

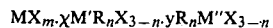

$$MX_m \cdot \chi M'R_n X_{3-n} \cdot yR_n M''X_{3-n}$$

where $\chi$ ranges between 0 to 3.0; m ranges between 2 to 3.5; n ranges between 0 to 3.0; and y ranges between 0 to 1; and R is an organic radical such as a $C_1$-$C_8$ alkyl ($CH_3$, $C_2H_5$, $C_3H_7$, etc.), or other organic radical that normally is known and described by Mole and Jeffrey[1]; M is a transition metal from Groups IIIB, IVB and VB of the Periodic Table; M' is an element from Groups IA, IIA AND IIIA of the Periodic Table; M'' is an element from Groups IA, IIA, IIB and IIIA of the Periodic Table; and X is a halogen from Group VIIA of the Periodic Table. $yR_n M''X_{3-n}$ is the component used in reduction of the transition metal component.

[1] T. Mole and E. A. Jeffrey, "Organoaluminum Compounds," Elsevier (1972).

Preferred Ziegler transition metal halide catalysts employed in the present invention include those having formulations of

$$TiCl_m \cdot \chi AlR_n Cl_{3-n}$$

where R, m, $\chi$, and n are as described above. Therefore, the Ziegler catalyst which can be entrapped in PTFE fibers utilizing the techniques described herein is not restricted to where the $TiCl_3$ is previously cocrystallized only with aluminum chloride in a ball milling step.

The fibrillatable PTFE of choice for this invention is obtained from E. I. duPont de Nemours & Co., Wilmington, Del. 19898, as TEFLON K ® which is sold as a Particle Control Additive. It is a white powder Type 10 for use with the Ziegler-type transition metal halide catalysts, which are the preferred catalysts of this invention.

Very generally, the process used to obtain the enlarged transition metal halide catalytic particles in a polytetrafluoroethylene (PTFE) web comprises adding the PTFE to the reduced, activated Ziegler catalyst powder, mixing to form a homogeneous blend, and working this blend to form a fiber-web of PTFE having a particle size larger than 10 microns mean diameter and containing many catalyst fines having a diameter of less than 10 microns mean diameter.

For best results, TEFLON K ®, Type 10, PTFE should always be handled at or below room temperature (20° C.) so as to avoid further agglomeration of the PTFE particles. It should be spread as evenly as possible over the catalyst to be treated, such as by sprinkling or by continuouslly adding the PTFE to a continuous plant process, thus avoiding the batch addition of the PTFE which increases the likelihood of further agglomeration of the PTFE.

A homogeneous mixture is necessary if the fiber-web is to pervade the entire catalyst mixture. Dry mixtures can be prepared with most mixers but it should be noted that violent mixing such as with Waring Blendors, hammermills, or intensifier bars seems to initiate fibrillation and this is essential if tumbling is the only other working step.

Working is the application of a compressive shear to the mixture of TEFLON K ® PTFE and the catalyst powder to be treated so that the fiber-web is developed within the mixture.

The working action applies a compressive shear to the mixture, the terms troweling and smearing are also descriptive of that kind of action. In the laboratory, this can be done with a spatula, a mortar/pestle or a small ball mill. In the plant, mullers, ball mills, slow-turning mixers or blenders, screw conveyors, spray driers and many more devices will do some or all of the fibrillation.

The working action just described must also be a slow action. Another consideration is that the mixture should be low in water content so that moisture does not serve as a lubricant to interfere with the working action.

One of the most important considerations is an adequate working temperature. The fiber-web will not form below 20° C. nor will it survive above 320° C. A common working temperature is 100° C. but with many materials it can be lower as determined by experimentation.

Any specific material to be treated will seem to have a minimum working temperature below which no obvious fibrillation occurs. Above this temperature there seems to be useful combinations of working conditions, dosage of TEFLON K ® PTFE and temperature. Stated a bit differently, within limits, working is faster and more effective with
  higher temperatures,
  higher dosages of TEFLON K ® PTFE, and
  better working action.

Well worked mixtures with TEFLON K ® PTFE will show evidences of fibrillation such as an increased cohesiveness, an obvious change in texture, and material on a spatula will exhibit "whiskers" hanging over the edge. These "whiskers" seem to be web fragments made visible only by their trapped fines.

The first stage of fiber development, fiber initiation, is the most difficult and occasionally requires a different working action. A brief treatment of the mix in a hammermill, Waring Blendor or most any high-speed, intense mixer does this fiber initiation, presumably by elongating the TEFLON K ® PTFE particles by impact. This kind of pretreatment is optional though generally helpful to most succeeding working steps, but it is frequently essential ahead of working by tumbling only.

The dosage of TEFLON K ® PTFE will be higher in laboratory work than it will be later in the plant. The method of treatment will be a matter of choice, but it should generally follow the method of plant production if possible, i.e., wet or dry treatment, etc. Start out with a high dosage such as $\frac{1}{2}$% or even 1% TEFLON K ® PTFE if this is the first trial. The dosages referred to are the weight percent of resin in the dry material being treated. Mix the powdered TEFLON K ® PTFE with the material in a Waring Blendor for a couple minutes. Stop the blender occasionally to get the powders down into the blades if necessary. Heat the mix to 100° C. and work as above.

After the first trial, conditions should be altered to produce the product desired.

A small laboratory ball mill can be a convenient working device. Fill the mill about 75-85% full of balls and mixture to minimize the cascading of the balls. The mill and contents can be preheated and will hold the heat well, or heat lamps may be used. This device makes work with toxic products relatively safe and easy since the material will be enclosed in the mill while it is being worked.

In addition to the previously mentioned equipment, spray dryers with either nozzles or spinning discs will do a good job of fibrillation. Additional working with a hot blending operation has proven beneficial to some treatments.

Extruders also can be effective working devices. Lodge blenders have done well also, but be aware that some large sizes have air pressurized bearings which levitate the mix by aeration so that it cannot be worked.

Plant scale production generally requires a lower dosage because the larger mass of material being handled adds to the compressive shear action. Since a higher dosage than necessary may lead to greater cohesion and reduced flowability, it is well to start with a half to a fourth of the laboratory dosage. Should the treatment produce a poorly flowing product, it may usually be blended with more product to give a desirable finished product.

It is sometimes desirable to prepare a concentrate of powder and TEFLON K ® PTFE at from, say, four to ten times the optimum dosage, and then blend it off to the desired final concentration in one massive dilution or by a gradual dilution. This is referred to as a master blend technique.

Fibril initiation is easier at these higher concentrations of TEFLON K ® PTFE. This method of treatment also permits an easier fibrillation of some difficult materials by starting the fibrillation at these higher concentrations. This is also a means for initiating fibrillation with temperature and working speed being short of optimum.

Care must be exercised to stop the mechanical working of the master mix or concentrate before it becomes too fibrillated. If not, further blending may become quite difficult.

An interesting advantage of the master blend method is that the total working time can frequently be less than with the normal working procedure. Time can be saved since fiber initiation is much more rapid at the higher loading of TEFLON K ® PTFE in the master mix. Also, much less time is needed to blend to the final dilution than to have worked the whole charge from the start.

This master blend method also permits a flexibility in the use of working machinery by using the equipment with the best working action for the master mix and then using less efficient equipment for blending it off.

It is possible to change particles of TEFLON K ® PTFE particle control additive into fibers by passing a proper mixture through a region of turbulent gas flow. This has been accomplished by use of orifice plates, Venturi tubes, etc., and it has been done with various addition methods, including spraying a fine mist of diluted TEFLON K, Type 20, into the hot gas stream which was carrying the powder to be processed. The Melt-Blowing Process of Exxon Research could be used for mixing.

The invention is further illustrated by the following examples:

EXAMPLE 1

$TiCl_3.0.33\ AlCl_3$ produced by the reduction of $TiCl_4$ with aluminum and then dry ball milled was obtained from the Stauffer Chemical Company as $TiCl_3.AA$ or $TiCl_3.A$ and was ground or ball milled in the presence of dry TEFLON K ® PTFE. During the ball milling, the surface area of the catalyst component was increased with concomitant increase in catalyst activity. There was a total absence of poisoning of the catalyst by the inert TEFLON K ® PTFE. The catalyst including the fines which normally lead to a wide particle size distribution are in this process, held by submicron strands of PTFE. The polymer made with these catalyst particles in combination with an aluminum alkyl cocatalyst by conventional polymerization techniques have a narrow particle size distribution in those instances where the catalyst system has a narrow particle size distribution and a wide particle size distribution when employing a catalyst of wide particle size distribution.

$TiCl_3.0.33\ AlCl_3$ that has been ball milled and otherwise treated to improve its activity and stereospecificity, e.g., ether/$TiCl_4$ treatments, was also ball milled with dry TEFLON K ® PTFE to agglomerate the catalyst particles in a web of PTFE fibers. The results are summarized in TABLES I and II.

Table I clearly illustrates that the particle size of the catalyst is increased. It is further clear that by increasing the ball milling time the particle size distribution increases while the overall particle size decreases. Nevertheless, it is clearly demonstrated that the overall particle size of the catalyst component prepared in accordance with this invention is significantly increased over the conventional titanium halide Ziegler catalyst components.

Table II clearly illustrates that the polymers made in accordance with this invention are obtained with an overall particle size significantly larger than the polymers obtained by polymerizing propylene in the presence of conventionally prepared catalysts.

It is also understood that materials other than TEFLON K ® PTFE or special formulations of polytetrafluoroethylene will serve to entrap the catalyst particles as disclosed here, as well as other polymeric materials capable of fibrillating on mechanical treatment as described above.

It is furthermore clearly envisioned that polytetrafluoroethylene treated with other materials such as Lewis bases or Lewis acids can be used in the above described treatment, thereby accomplishing two or more objectives, agglomerating catalyst particles and activating the Ziegler catalyst.

All above descriptions are thought to be unique in that they modify the nature of the Ziegler transition metal halide catalyst, which in turn modifies the nature of the product made from such a catalyst.

TABLE I

| | | | | CATALYSTS TREATED WITH TEFLON K (TYPE 10) | | | | | | | |
|---|---|---|---|---|---|---|---|---|---|---|---|
| | | | | | | | | Catalyst Properties | | | |
| Experiment No. (4375-) | Catalyst Type | Teflon Wt % | Ball-milled, Minutes | Catalyst Appearance | | | Settle in C7, Seconds[a] | Efficiency, w/w | Wax % | C7-Insol. % | Polymer +200 Mesh, Wt % |
| | | | | Shape | Particle Size Distribution | Size mm | | | | | |
| 28-0(Control) | TiCl3AA | — | — | Irregular | Wide | $1 \times 10^{-3}$ | 180 | 41 | 2.0 | 94.3 | 12 |
| 29-0(Control) | TiCl3A | — | — | Irregular | Wide | $1 \times 10^{-1}$ | | 30.4 | | 91.9 | |
| 28-1A | TiCl3AA | 1 | 15 | Plates | Narrow | 5 | 1 | | | | |
| 28-1B | " | 0.125 | 15 | Powder | Wide | $1 \times 10^{-3}$ | 10 | 41 | 2.6 | 94.6 | 14 |
| 28-2B | " | 0.1 | Ground | Clumped | Medium | 2 | 1 | | | | |
| 28-2C | " | 0.01 | " | " | " | 2 | 1 | | | | |
| 29-1 | " | 2 | 15 | Plates | Narrow | 10 | 1 | | | | |
| 29-1B | " | 2 | 30 | " | " | 3 | 1 | | | | |
| 29-2 | " | 2 | 60 | Powder | Medium | 0.1 | 5 | | | | |
| 29-2B | " | 2 | 120 | " | Wide | <0.1 | 60 | | | | |
| 29-3 | " | 1 | 15 | Plates | Medium | 3 | 1 | | | | |
| 29-3B | " | 1 | 30 | Powder | " | 0.1 | 5 | | | | |
| 29-4 | " | 1 | 60 | Powder | Wide | <0.1 | >120 | | | | |
| 29-5 | " | 2 | 60 | " | " | 0.1 | 5 | 34 | 1.9 | 95.3 | 1.2 |
| 29-9 | TiCl3A | 0.5 | 60 | Powder | Wide | <0.1 | | | | | |
| 29-9B | " | 1.0 | 75 | " | " | 0.1 | 5 | | | | |
| 29-10 | " | 1.0 | 120 | " | " | <0.1 | 120 | 31.9 | 5 | 92.1 | 7.5 |
| 29-11 | " | 0.5 | 240 | " | " | | | | | | |
| 32-1 | TiCl3*[a] | 0.2 | 120 | Plates | Medium | 2 | 5 | | | | |
| 32-1B | "[a] | 0.2 | 240 | Powder | | | 5 | | | | |
| 32-2 | STP[b] | 1.0 | 15 | Plates | Medium | 2-5 | <5 | | | | |

TABLE I-continued
CATALYSTS TREATED WITH TEFLON K (TYPE 10)

| Experiment No. (4375-) | Catalyst Type | Teflon Wt % | Ball-milled, Minutes | Catalyst Appearance Shape | Catalyst Appearance Particle Size Distribution | Size mm | Settle in C7, Seconds[a] | Efficiency, w/w | Waxy % | C7- Insol. % | Polymer +200 Mesh, Wt % |
|---|---|---|---|---|---|---|---|---|---|---|---|
| 32-3 | STP[c] | 1.0 | 15 | " | " | 2-5 | <5 | | | | |

[a] Experimental catalyst having extremely fine particle size (0.5 to 30 microns)
[b] STP catalyst activated with 0.96 (i-C$_5$H$_{11}$)$_2$O and 2.2 TiCl$_4$
[c] STP catalyst activated with 0.83 (i-C$_5$H$_{11}$)$_2$O and 2.5 TiCl$_4$

TABLE II
POLYPROPYLENE PARTICLE SIZE DISTRIBUTIONS

| Catalyst No. Identification Particle Size Distribution | (1) 3915-73-9A TiCl$_3$AA | (1) 4375-28-0 TiCl$_3$AA | 4375-28-1B TiCl$_3$AAF.1 | 4375-29-5 TiCl$_3$AAF.2 | (2) 4375-29-10 TiCl$_3$AF.1 |
|---|---|---|---|---|---|
| 20 mesh, wt % | 0.7 | 0.2 | 3.5 | 16.4 | 4.6 |
| 60 mesh, wt % | 18.9 | 30.4 | 42.0 | 65.9 | 44.5 |
| 100 mesh, wt % | 29.1 | 30.9 | 23.8 | 10.9 | 20.9 |
| 200 mesh, wt % | 30.5 | 26.7 | 16.8 | 5.5 | 22.4 |
| 325 mesh, wt % | 9.5 | 7.8 | 8.0 | 0.9 | 7.1 |
| +325 mesh, wt % | 11.1 | 4.0 | 5.9 | 0.4 | 0.5 |
| loss mesh, wt % | 0.2 | 0.0 | 0.0 | 0.0 | 0.0 |

(1) Untreated commercial catalyst
(2) Catalyst not previously ballmilled
Note: Number = particles still on mesh The catalysts in Experiments Nos. 32-2 and 32-3 comprise a TiCl$_4$ which has been reduced in a diluent with an aluminum alkyl chloride and subsequently treated with the indicated amount of ether, followed by a treatment with the indicated amount of TiCl$_4$. The resulting catalysts have the formula TiCl$_3$.0.005 AlCl$_3$.0.09 (indicated ether). These catalysts are exceptionally active and it is highly advantageous to be able to form the relatively large active particles of the invention.

It can be seen from an examination of the data in these Tables I and II that dramatic changes in the particle size of the catalyst and the polymer resulting therefrom can be accomplished without appreciable loss of catalyst efficiency.

EXAMPLE 2

Several PTFE agglomerated Ziegler catalyst compositions were prepared in accordance with the procedure described in Example 1 using Ziegler transition metal halide catalysts produced by ball milling a reduced titanium chloride component with AlCl$_3$. The results are summarized in the following Table III. In Table III, the Ziegler catalyst of experiments 1-2 was a pure TiCl$_3$ obtained from the Stauffer Chemical Company as TiCl$_3$.HA. This catalyst was produced by the reduction of TiCl$_4$ with hydrogen at above about 400° C. followed by dry ball milling. The Ziegler catalysts of experiments 3 and 4 were prepared by reducing TiCl$_4$ with a mixture of diethylaluminum chloride (DEAC) and ethylaluminum dichloride (EADC) at −5° C. for 3 hours (1.5 mole mixture:mole Ti; 0.5 DEAC:1.0 EADC mole ratio). The reduced catalyst of experiment 4 was then activated by heating at 65° C. for one hour, which resulted in an activated catalyst having the formula TiCl$_{2.73}$.0.39 AlCl$_3$. Experiment 3 catalyst was not heat-activated and had the formula TiCl$_{3.0}$.0.17 EtAlCl$_2$.

Experiments 1 and 2 also included polymerization tests where propylene was polymerized to determine effect of catalyst agglomeration thereon.

TABLE III

| Experiment No. | Wt. % Teflon[a] | Cat. Eff.[b] | Waxy Polymer % | C$_7$- Insol. | Wt. % Catalyst Particles <10μ | Catalyst and Polymer Appearances |
|---|---|---|---|---|---|---|
| 1 (Control) | 0 | 7.4 | 17.3 | 77.7 | Approx. 10 | Coarse plus fines |
| 2 | 2 | 18.5 | 7.3 | 86.0 | 0 | Coarse |
| 3 | 2 | NA | NA | NA | 0 | Coarse catalyst; no fines |
| 4 | 2 | NA | NA | NA | 0 | Coarse catalyst; no fines |

[a] Teflon added to catalyst, ball milled for 1 hour.
[b] Gms polymer per gm catalyst during 2 hour polymerization: 65° C. ± 1°; 765 ± 5 mm total pressure; 2Et$_2$AlCl:TiCl$_3$ mole ratio; 5 m-moles TiCl$_3$ per 500 cc C$_7$H$_{18}$ solvent.

The results of Table III verify that substantially any type of Ziegler transition metal halide catalyst may be treated with fibrillatable PTFE in accordance with the present invention to produce a superior entrapped catalyst. Moreover, a comparison of the results of experiments 1 and 2 of Table III confirm the entrapment technique of the invention does not poison the Ziegler catalyst.

In the above examples, the TEFLON K ® PTFE referred to, when used as a solid, is available from the E. I. duPont Company, Fluorocarbons Division, as Type 10. It is a free flowing white powder with the following characteristics:
Average Particle Size—500 microns
Bulk Density—450 g/l
Intrinsic Density—2.2 g/ml
Surface Area—10 M$^2$/g Crystallinity—95%
Melting Range—320°–340° C. (608°–644° F.)
Solubility—Insoluble in all common solvents
Chemical Inertness—Stable to all common reagents at ordinary temperatures. Reacts with alkali metals and fluorine or reactive agents yielding fluorine.

What is claimed is:

1. Ziegler transition metal halide catalyst composition comprising a plurality of agglomerated particles having a means particle diameter of from about 10 up to 1,000 microns, each agglomerated particle comprising a web of polytetrafluoroethylene submicroscopic fibers entangled with a plurality of Ziegler transition metal halide catalyst particles, said Ziegler transition metal halide catalyst having the formula:

$$MX_m \cdot \chi M'R_nX_{3-n} \cdot yR_nM''X_{3-n}$$

where $\chi$ ranges between 0 to 3.0; m ranges between 2 to 3.5; n ranges between 0 to 3.0; and y ranges between 0 to 1; and R is an alkyl group having 1 to 8 carbons; M is a transition metal from Groups IIIB, IVB and VB of the Periodic Table; M' is an element from Groups IA, IIA and IIIA of the Periodic Table; M'' is an element from Groups IA, IIA, IIB and IIIA of the Periodic Table; and X is a halogen from Group VIIA of the Periodic Table.

2. The composition of claim 1 wherein the mean particle diameter of said agglomerated catalyst composition is from 20 to 1,000 microns.

3. The composition of claim 1 wherein the mean particle diameter of said agglomerated catalyst composition is from 20 to 50 microns.

4. The composition of claim 1 wherein said Ziegler transition metal halide catalyst is a reduced $TiCl_m \cdot \chi AlR_nCl_{3-n}$.

5. The composition of claim 4 wherein the Ziegler transition metal halide catalyst is a reduced $TiCl_3 \cdot \chi AlCl_3$, where $\chi$ ranges between 0 to 1.5, and being produced from a grinding step.

6. The composition of claim 4 wherein the Ziegler transition metal halide catalyst is an aluminum alkyl reduced $TiCl_m \cdot \chi AlR_nCl_{3-n}$
wherein m ranges between 2.0 and 3.5; $\chi$ ranges between 0.001 to 1.5; n ranges between 0.01 to 3.

7. A process for increasing the mean particle size of Ziegler transition metal halide catalysts having the formula:

$$MX_m \cdot \chi M'R_nX_{3-n} \cdot yR_nM''X_{3-n}$$

where $\chi$ ranges between 0 to 3.0; m ranges between 2 to 3.5; n ranges between 0 to 3.0; and y ranges between 0 to 1; and R is an alkyl group having 1 to b 8 carbons; M is a transition metal from Groups IIIB, IVB and VB of the Periodic Table; M' is an element from Groups IA, IIA and IIIA of the Periodic Table; M'' is an element from Groups IA, IIA, IIB and IIIA of the Periodic Table; and X is a halogen from Group VIIA of the Periodic Table; said process comprising working an effective amount of a polytetrafluoroethylene powder, capable of forming a submicroscopic web upon working at a temperature above that necessary to achieve fibrillation, with said catalyst composition for a period of time sufficient to form a plurality of individual web entrapped catalyst agglomerates.

8. The process of claim 7 wherein said fibrillatable polytetrafluoroethylene powder is used as a dry powder.

9. The process of claim 7 wherein said Ziegler transition metal halide catalyst is a reduced $TiCl_m \cdot \chi AlR_nCl_{3-n}$.

10. The process of claim 7 wherein said Ziegler transition metal halide catalyst is a reduced $TiCl_3 \cdot \chi AlCl_3$, where $\chi$ ranges between 0 to 1.5, and being produced from a grinding step.

11. The process of claim 7 wherein the Ziegler transition metal halide catalyst is an aluminum alkyl reduced $TiCl_m \cdot \chi AlR_nCl_{3-n}$
wherein m ranges between 2.0 to 3.5; $\chi$ ranges between 0.001 to 1.5; n ranges between 0.01 to 3.

12. The process of claim 7 wherein the grinding is performed for about 1 hour.

13. A catalyst system for the polymerization of alpha-olefin, said catalyst system comprising an organoaluminum catalyst component and a transition metal halide catalyst component having the formula:

$$MX_m \cdot \chi M'R_nX_{3-n} \cdot yR_nM''X_{3-n}$$

where $\chi$ ranges between 0 to 3.0; m ranges between 2 to 3.5; n ranges between 0 to 3.0; and y ranges between 0 to 1; and R is an alkyl group having 1 to 8 carbons; M is a transition metal from Groups IIIB, IVB and VB of the Periodic Table; M' is an element from Groups IA, IIA and IIIA of the Periodic Table; M'' is an element from Groups IA, IIA, IIB and IIIA of the Periodic Table; and X is a halogen from Group VIIA of the Periodic Table; said transition metal halide catalyst component comprising a plurality of individual polytetrafluoroethylene web entrapped catalyst agglomerates.

14. The catalyst system of claim 13 wherein the mean particle diameter of said web entrapped catalyst agglomerates is from about 20 to 1,000 microns.

15. The catalyst system of claim 13 wherein the mean particle diameter of said web entrapped catalyst agglomerates is from about 20 to about 50 microns.

16. The catalyst system of claim 13 wherein said Ziegler transition metal halide catalyst is a reduced $TiCl_m \cdot \chi AlR_nCL_{3-n}$.

17. The catalyst system of claim 13 wherein said Ziegler transition metal halide catalyst is a reduced $TiCl_3 \cdot \chi AlCl_3$, where $\chi$ ranges between 0 to 1.5, and being produced from a grinding step.

18. The catalyst system of claim 13 wherein said Ziegler transition metal halide catalyst is an aluminum alkyl reduced $TiCl_m \cdot \chi AlR_nCl_{3-n}$
wherein m ranges between 2.0 to 3.5; $\chi$ ranges between 0.001 to 1.5; n ranges between 0.01 to 3.

* * * * *